US011182700B2

(12) United States Patent
Judge et al.

(10) Patent No.: US 11,182,700 B2
(45) Date of Patent: Nov. 23, 2021

(54) METHODS, DEVICES, AND SYSTEMS FOR AUTOMATICALLY DETECTING, TRACKING, AND VALIDATING TRANSIT JOURNEYS

(71) Applicant: MasterCard International Incorporated, Purchase, NY (US)

(72) Inventors: Edward William Judge, London (GB); James Christian Noë, Kent (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 634 days.

(21) Appl. No.: 15/187,049

(22) Filed: Jun. 20, 2016

(65) Prior Publication Data

US 2016/0379141 A1 Dec. 29, 2016

(30) Foreign Application Priority Data

Jun. 25, 2015 (EP) .................................... 15173924

(51) Int. Cl.
*G07B 15/02* (2011.01)
*G06Q 10/02* (2012.01)
(Continued)

(52) U.S. Cl.
CPC ........... *G06Q 10/02* (2013.01); *G06Q 20/047* (2020.05); *G06Q 20/3224* (2013.01);
(Continued)

(58) Field of Classification Search
CPC .... G06Q 50/30; G06Q 2240/00; G07B 15/02; H04W 4/42
See application file for complete search history.

(56) References Cited

U.S. PATENT DOCUMENTS 8,868,223 B1 * 10/2014 Sharifi .................. G06F 16/683
700/94
2008/0201212 A1 * 8/2008 Hammad ............. G06Q 20/045
705/13
(Continued)

FOREIGN PATENT DOCUMENTS

EP          3109818       6/2015
JP        2013210993     10/2013
(Continued)

OTHER PUBLICATIONS

Thiagarajan, et al., Cooperative Transit Tracking using Smartphones, SenSys'10—Proceedings of the 8th ACM Conference on Embedded Networked Sensor Systems, Nov. 2010, pp. 85-98 (Year: 2010).*

(Continued)

*Primary Examiner* — Daniel Vetter
(74) *Attorney, Agent, or Firm* — Otterstedt, Wallace & Kammer, LLP

(57) ABSTRACT

Methods, devices, and systems for automatically detecting, tracking, and validating transit journeys are provided. A transit data processing engine receives sensory data gathered by a plurality of sensors of a mobile device registered for automatic tracking of transit journeys and detects, based on transit data of one or more transit agencies and a first set of the sensory data, a potential transit event with the one or more transit agencies. Based on the transit data and a second set of the sensory data, received subsequently to the first set of the sensory data, the processing engine determines then whether the potential transit event defines a transit journey having a starting point with the one or more transit agencies. If the potential transit event defines the transit journey, the transit data processing engine continues to analyse the
(Continued)

sensory data being received to detect an ending point of the transit journey.

18 Claims, 4 Drawing Sheets

(51) Int. Cl.
| | |
|---|---|
| *H04W 4/80* | (2018.01) |
| *G06Q 50/30* | (2012.01) |
| *G06Q 30/02* | (2012.01) |
| *G06Q 20/32* | (2012.01) |
| *G06Q 20/04* | (2012.01) |

(52) U.S. Cl.
CPC ..... *G06Q 20/3274* (2013.01); *G06Q 30/0205* (2013.01); *G06Q 50/30* (2013.01); *G07B 15/02* (2013.01); *H04W 4/80* (2018.02)

(56) References Cited

U.S. PATENT DOCUMENTS

| | | | | |
|---|---|---|---|---|
| 2010/0017275 A1* | 1/2010 | Carlson | ............ | G06Q 20/32 |
| | | | | 705/13 |
| 2010/0299615 A1 | 11/2010 | Miluzzo | | |
| 2011/0166936 A1* | 7/2011 | Dixon | ............ | G06Q 10/04 |
| | | | | 705/14.58 |
| 2012/0203732 A1 | 8/2012 | Oono | | |
| 2013/0281124 A1 | 10/2013 | Laumen | | |
| 2014/0278616 A1* | 9/2014 | Stone | ............ | G06Q 10/025 |
| | | | | 705/6 |
| 2014/0289026 A1* | 9/2014 | Neumann | ............ | G01S 5/02 |
| | | | | 705/13 |
| 2014/0365119 A1* | 12/2014 | Haverinen | ............ | G01C 21/206 |
| | | | | 701/500 |
| 2015/0031400 A1* | 1/2015 | Tian | ............ | H04W 4/023 |
| | | | | 455/456.3 |
| 2015/0073702 A1* | 3/2015 | Jouaux | ............ | H04W 4/42 |
| | | | | 701/465 |
| 2016/0055428 A1* | 2/2016 | Raina | ............ | H04W 12/003 |
| | | | | 705/5 |
| 2016/0055693 A1* | 2/2016 | Somani | ............ | G07B 15/02 |
| | | | | 340/5.61 |

FOREIGN PATENT DOCUMENTS

| | | |
|---|---|---|
| JP | 2015114738 | 6/2015 |
| WO | WO2008052356 | 5/2008 |
| WO | WO2016209750 | 12/2016 |

OTHER PUBLICATIONS

Trépanier, et al., Individual Trip Destination Estimation in a Transit Smart Card Automated Fare Collection System, Journal of Intelligent Transportation Systems Technology Planning and Operations, Apr. 2007, pp. 1-29 (Year: 2007).*

Stenneth, et al., Transportation Mode Detection using Mobile Phones and GIS Information, ACM SIGSPATIAL GIS '11—Proceedings of the 19th ACM SIGSPATIAL International Conference on Advances in Geographic Information Systems, Nov. 2011, pp. 54-63 (Year: 2011).*

Gonzalez, et al., Automating Mode Detection Using Neural Networks and Assisted GPS Data Collected Using GPS-Enabled Mobile Phones, 15th World Congress on Intelligent Transportation Systems, Nov. 2008, pp. 1-12 (Year: 2008).*

Touch and Travel Germany webpage downloaded on Mar. 15, 2019, 4 pages https://www.transportticket.com/touchandtravel.

Yuko Sato, JPO as ISA, Patent Cooperation Treaty Written Opinion, PCT/US2016/038297, dated Oct. 11, 2016, 3 pages.

Yuko Sato, JPO as ISA, Patent Cooperation Treaty International Search Report, PCT/US2016/038297, dated Oct. 11, 2016, 4 pages.

European Patent Office Search Report, dated Nov. 20, 2015, 6 pages, EPO Appln 15173924.0.

* cited by examiner

METHODS, DEVICES, AND SYSTEMS FOR AUTOMATICALLY DETECTING, TRACKING, AND VALIDATING TRANSIT JOURNEYS

CROSS-REFERENCE TO RELATED APPLICATION

This application claims foreign priority to European Patent Application No. 15173924.0 filed 25 Jun. 2015 entitled METHODS, DEVICES, AND SYSTEMS FOR AUTOMATICALLY DETECTING, TRACKING, AND VALIDATING TRANSIT JOURNEYS, the complete disclosure of which is expressly incorporated herein by reference in its entirety for all purposes.

FIELD OF THE INVENTION

The present invention generally relates to methods, devices, and systems for automatically detecting and tracking passengers' journeys in and across transit systems and facilitating fare determination and payment collection for such journeys. In particular, but not exclusively, the invention relates to methods, devices, and systems that utilize mobile devices carried by passengers and data collected by such devices to detect starting and ending points of a journey, track the journey, and correlate the journey to an existing transit route to automatically calculate a respective fare and collect a payment for the journey.

BACKGROUND OF THE INVENTION

Transit systems, such as public transportation systems, e.g., trains, subways (tube, underground, metro, or the like), buses, trams, ferries, and the like are widely used by people to travel to and between different destinations (e.g., to commute to an office), particularly in urban areas. To access a transit system, a passenger is typically required to validate himself/herself in some manner and/or present some form of a fare payment. The most common scenarios for obtaining access to a transit system include presenting a paper ticket (single ride, return journey, or a day or season pass) to a member of the transit system staff, sliding a magnetic ticket (single ride, return journey, or a day or season pass) into a transit terminal (or other similar device), using a contactless ticket/card or a regular contactless payment card to touch (touch-in or touch-out) a contactless reader. These validation points are located at various points of the transit system, such as at entry points (e.g., entry gates, contactless readers on buses, and the like), exit points (e.g., exit gates), transfer points, and/or the like. Accordingly, passengers travelling on a transit system are funnelled through the validation points of the transit system, leading to queuing. When the capacity of the validation points is exceeded, this bottleneck arrangement causes significant delays to passengers' access to the transit system and impedes their movement through the transit systems.

Such delays are particularly prevalent in old travel systems, whose old structures and small open areas/ticket areas limit the number of validation points that could be employed by the system. Although many such old transit systems are able to support additional fleet for carrying a greater number of passengers through the system, they have reached their capacity in respect of the validation points. These systems often have no physical space left to provide for an additional validation point. Therefore, as the number of passengers using the public transit systems increases, the delays become longer, extending passengers' commute time. Additionally, overcrowded validation areas constitute a safety hazard and can lead to accidents.

Another problem is that some transit systems have self-validation areas that rely on the passengers to validate their travel, but do not restrict the passengers from entering or exiting the transit system. These are typically stand-alone contactless readers that are not connected to any gates or other barriers and are merely placed along the passengers' path through the transit system. Passengers however often fail to self-validate, sometimes deliberately, more often inadvertently. For example, the passenger may touch-in to enter the transit system but forget to touch-out when exiting the transit system. Without such self-validation, however, the transit system does not know how far the passenger has travelled, and consequently may charge the passenger the maximum fare available. This results in the passenger being overcharged for their travels unnecessarily, which subsequently leads to customer service issues and costs and reputational issues.

There is therefore a need to provide a method, device, and/or system that would increase the validation capacity of transit systems, whilst ensuring that passengers do not take advantage of the transit systems by travelling ticketless. There is a further need to prevent overcharges being generated and transferred to passengers who either forgot or were unsuccessful in validating their travels. More generally, there is need for methods, devices, and systems that would automatically detect and track passengers' journeys in and across transit systems and facilitate accurate fare determination and payment collection for such journeys.

SUMMARY

The described embodiments of the invention provide for methods, devices, and systems for automatically detecting, tracking, and validating transit journeys by utilizing the advancements in mobile technologies along with the increased use of mobile devices by the transit passengers.

In one embodiment, the present disclosure provides a computer implemented method of automatically tracking transit journeys. The method comprises receiving, at a transit data processing engine, sensory data gathered by a plurality of sensors of a mobile device registered for automatic tracking of transit journeys; detecting, by the transit data processing engine, based on transit data of one or more transit agencies and a first set of the sensory data, a potential transit event with the one or more transit agencies; determining, by the transit data processing engine, based on the transit data of the one or more transit agencies and a second set of the sensory data, whether the potential transit event defines a transit journey having a starting point with the one or more transit agencies, wherein the second set of the sensory data is received subsequently to the first set of the sensory data; and analysing, by the transit data processing engine, the sensory data being received subsequently to the second set of the sensory data to detect an ending point of the transit journey, if the potential transit event defines the transit journey with the one or more transit agencies.

In this manner, transit systems are enabled to automatically detect and track their passenger's transit journeys and correlating such journeys to the existing transit routes, without requiring or relying on their passengers to swipe tickets, tap in at transit terminals, or otherwise identify themselves and their journeys. Therefore, entry/exit delays at the transit stops can be reduced, faults with the transit system can be decreased (such as due to a faulty ticket, missed validations), and reliability can improved, thereby advantageously resulting in improved passenger experiences and additional user services being enabled.

In some embodiments, the method further comprises transmitting, to the mobile device, a message indicating that the transit journey has been detected. In this manner, the user of the mobile device may for example be informed and assured in that his or her journey has been detected.

In some examples the message comprises a request for a user of the mobile device to confirm the transit journey.

In some example embodiments, the method further comprises receiving a response to the request. If the response is affirmative, the sensory data being received subsequently to the second set of the sensory data is analysed to detect the ending point of the transit journey. If the response is negative, the sensory data being received is analysed to detect another potential transit event with the one or more transit agencies.

In this manner, the users of the system (passengers) are provided with control over detected transit journeys, such as to correct misidentified transit journey, or have a particular transit journey being processed using a more traditional approach.

In some example embodiments, the method further comprises, in response to determining that the potential transit event defines the transit journey, generating validation data confirming the transit journey.

In some example embodiments, the validation data comprises one or more of an e-ticket for displaying on the mobile device, a QR-code for displaying on the mobile device, a barcode for displaying on the mobile device, and/or a validation code for storing in NFC readable memory of the mobile device.

Thus, the need for the transit users (passengers) to buy tickets is obviated, saving users' time and enhancing their experience, whilst also decreasing transit agencies' use of resources and expenditure in association with the transit ticket processing.

In some example embodiments, the validation data is generated at the mobile device.

In some example embodiments, the validation data is generated remotely to the mobile device and the method further comprises transmitting the validation data to the mobile device.

In some example embodiments, the sensory data comprises one or more of a geo-location of the mobile device, geo-fencing data, a cell tower location of the mobile device, an identification of a Wi-Fi network available to the mobile device, a received signal strength indication (RSSI) associated with the available Wi-Fi network, an identification of a Bluetooth beacon, acceleration data, direction data, audio data, and/or motion data.

In some example embodiments, the transit data of the one or more transit agencies comprises at least one of: a mode of transportation, geo-locations of one or more transit stations, timetables for transit services, real-time transit updates regarding provided transit services, identification and location data of Wi-Fi networks supported by the one or more transit agencies, and/or identification and location data of Bluetooth networks supported by the one or more transit agencies.

In some example embodiments, detecting the potential transit event with the first transit agency comprises one or more of determining that a geo-location of the mobile device is within a pre-defined distance to a geo-location of a transit station of the one or more transit agencies, determining that audio data of the first set of the sensory data has one or more pre-determined characteristics associated with the transit station of the one or more transit agencies, and/or determining that the mobile device is able to access a Wi-Fi network or a Bluetooth beacon accessible from an entry area of the transit station of the one or more transit agencies.

In some example embodiments, determining that the potential transit event defines the transit journey with the one or more transit agencies comprises one or more of: (1) determining that the sensory data, subsequent to the second set of the sensory data, comprises one or more geo-locations of the mobile device that correspond to one or more geo-locations along one or more transit routes supported by the one or more transit agencies, wherein each of the one or more transit routes includes the starting point; (2) determining that that the sensory data, subsequent to the second set of the sensory data, comprises one or more geo-locations of the mobile device that correspond to geo-locations along a transit route supported by the one or more transit agencies and were gathered at times in agreement with one or more of a timetable of the transit route or real-time transit updates for the one or more transit agencies in association with the transit route; (3) determining that the mobile device is able to access a Wi-Fi network or Bluetooth beacon accessible from a departure area of a transit station of the one or more transit agencies, (4) determining that the mobile device is able to access a Wi-Fi network or Bluetooth beacon accessible from a transit vehicle of the one or more transit agencies, (5) determining that a speed of movement of the mobile device corresponds to an estimated speed of a transit vehicle on an estimated transit route with the one or more transit agencies, the estimated transit route including the starting point, and/or (6) receiving an indication of the transit journey based on user input at the mobile device.

In some example embodiments, analysing the sensory data to detect the ending point of the transit journey comprises correlating, based on the transit data, the sensory data being received to a first transit route of the one or more transit agencies comprising the starting point to detect the ending point of the transit journey on one of the one or more transit routes.

In some example embodiments, analysing the sensory data to detect the ending point of the transit journey further comprises detecting, based on a third set of the sensory data, a potential ending point of the transit journey along the first transit route; and analysing the sensory data received subsequently to the third set of the sensory data to confirm whether the potential ending point is the ending point of the transit journey.

In some example embodiments, detecting the potential ending point of the transit journey along the route comprises one or more of: determining that the third set of the sensory data comprises a geo-location of the mobile device that corresponds to a geo-location of a transit station of the first transit agency along the first transit route, determining based on the third set of the sensory data that the mobile device was able to access a Wi-Fi network or a Bluetooth beacon accessible from an arrival area of a transit station of the first transit agency along the first transit route, and/or determining based on the third set of the sensory data that the mobile device stopped moving along the first transit route of the first transit agency.

In some example embodiments, analysing the sensory data to detect the ending point of the transit journey comprises correlating, based on the transit data, the sensory data being received to one or more routes of the one or more transit agencies.

In some example embodiments, analysing the sensory data to detect the ending point of the transit journey further comprises detecting, based on a third set of the sensory data, a potential ending point of the transit journey along the one or more transit routes in response to determining one or more of: that the third set of the sensory data comprises a geo-location of the mobile device that corresponds to a geo-location of a transit station of the one or more transit agencies along the one or more transit routes, that the third set of the sensory data indicates that the mobile device was able to access a Wi-Fi network or a Bluetooth beacon accessible from an arrival area of a transit station of the one or more transit agencies along the one or more transit routes, and/or that the third set of the sensory data indicates that the mobile device stopped moving along the one or more transit routes of the one or more transit agencies; and analysing the sensory data received subsequently to the third set of the sensory data to confirm whether the potential ending point is the ending point of the transit journey.

In some example embodiments, the potential ending point is a transit station of the one or more transit agencies that corresponds to a geo-location of a mobile device included in the third set of the sensory data.

In some example embodiments, confirming that the potential ending point is the ending point of the transit journey comprises one or more of determining that one or more geo-locations detected by the mobile device subsequently to the third set of the sensory data are outside of the one or more transit route supported by the one or more transit agencies, and/or determining that, the mobile device is able to access a Wi-Fi network or a Bluetooth beacon accessible from an exit area of the transit station defining the potential ending point.

In some example embodiments, the method further comprises calculating, by the transit data processing engine, a fare for the transit journey based at least on the starting point and the ending point of the transit journey.

In some embodiments, the fare is further based on the transit route of the transit journey and/or travel times associated with the transit journey.

In some example embodiments, calculating the fare for the transit journey comprises: determining whether the transit journey falls within boundaries of a season ticket associated with the mobile device.

In some example embodiments, if the transit journey falls within the boundaries of the season ticket, the calculated fare is zero.

In some example embodiments, if the transit journey falls partially within the boundaries of the season ticket, the fare for the transit journey is calculated based on a part of the transit journey lying outside of the boundaries of the season ticket.

In some example embodiments, the method further comprises processing a payment to cover the calculated fare by generating a payment request for an amount comprising the calculated fare using payment credentials associated with the mobile device for transmission of the payment request to a payment gateway, or requesting a user of the mobile device to submit a payment for the amount comprising the calculated fair at the mobile device.

In some example embodiments, the payment is received through a mobile payment application installed at the mobile device.

In some example embodiments, the amount comprises fares calculated for a plurality of transit journeys.

In some example embodiments, the method further comprises providing, to the mobile device, a confirmation that the payment was processed.

In some example embodiments, if, based on the second set of the sensory data, a determination that the potential transit event is the transit journey with the one or more transit agencies fails, the method further comprises detecting a second potential transit event with the one or more transit agencies.

In some example embodiments, the second potential transit event is determined based on the transit data of the one or more transit agencies and one of the first set of the sensory data, the second set of the sensory data, and/or a subsequent set of the sensory data.

In some example embodiments, the sensory data is received in accordance with a reporting protocol defined in associated with the plurality of sensors, wherein the reporting protocol comprises a pre-defined schedule, is event-based, or is a combination thereof.

In some example embodiments, the method further comprises triggering an adjustment to the reporting protocol in response to one of detecting the potential transit event or detecting that the mobile device entered a pre-defined geo-fence area.

In some example embodiments, the adjustment comprises one or more of increasing a frequency of reporting the sensory data gathered by the plurality of sensors, and/or activating one or more additional sensors of the mobile device to gather and report additional sensory data.

In some example embodiments, the adjustment is triggered in response to one of failing to confirm that the potential transit event defines the transit journey or detecting that the mobile device exited a pre-defined geo-fence area.

In some example embodiments, the adjustment comprises one or more of decreasing a frequency of reporting the sensory data gathered by the plurality of sensors, and/or stopping reporting of sensory data from one or more sensors of the mobile device.

In some example embodiments, the method further comprises detecting a transit journey with a second of the one or more transit agencies starting at the ending point; calculating a fare for the transit journey with the second transit agency; updating the fare calculated for the transit journey with the first agency to include the fare calculated for the transit journey with the second agency; and processing a payment for the updated fare.

In some example embodiments, the transit journey comprises a first section (first leg) which lies within a transit network supported by a first of the one or more transit agencies, and a second section (second leg), which lied within a transit network supported by a second of the one or more transit agencies, wherein the first and second transit agencies are different.

In some example embodiments, any of the methods described above is executed at a backend server in communication with the mobile device.

In some example embodiments, any of the methods described above is executed at the mobile device.

In a second embodiment, a non-transitory computer readable medium is provided. The computer readable medium has instructions stored thereon which, when executed by at least one processor of a computer system, cause the computer system to carry out any of the methods described above.

In a third embodiment, mobile device is provided. The mobile device comprises a plurality of sensors configured to gather sensory data; at least one processor; a transit data processing engine; and a memory storing instructions, which when executed by the at least one processor cause the transit data processing engine to perform any of the methods described above.

In a fourth embodiment, backend server is provided. The backend server comprises at least one processor; a transit data processing engine; and a memory storing instructions, which when executed by the at least one processor cause the transit data processing engine to perform any of the methods described above.

By implementing procedures and associated systems, devices, and methods described hereinafter, transit agencies can avoid/postpone large capital investments in station expansion, and likewise should be able to reduce customer service costs through reduced call centre enquiries for incomplete journeys. The transit agencies are further enabled to increase their validation capacity, whilst maintaining accuracy or reliability of fare determination and payment collection processes.

BRIEF DESCRIPTION OF THE DRAWINGS

Implementations will now be described in detail, by way of example only, with reference to the accompanying drawings, in which.

DETAILED DESCRIPTION

Figure 1:
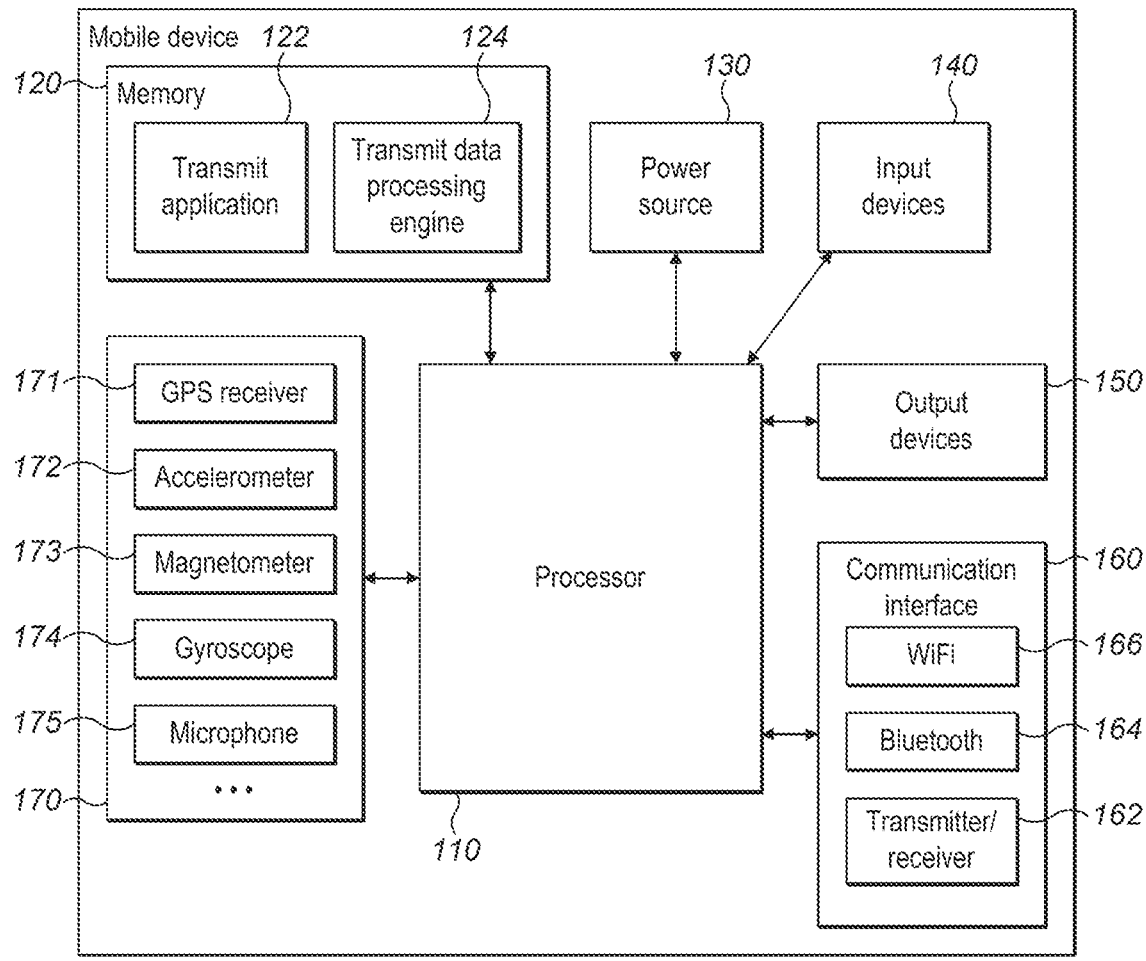
FIG. 1 shows an example of a mobile device suitable for hosting and running a transit application described herein, in accordance with some embodiments.

Mobile devices, particularly smart phones, have become a staple of everyday life and play an increasingly larger role in the everyday activities of people. Most smart phones and other mobile devices comprise a wide variety of sensors that can measure different parameters in association with the device, such as location of the device, its positioning and/or orientation, motions, various environmental conditions, and other parameters. These modern devices are capable of taking high-resolution images and recording high quality sounds. They often support different wireless networking standards (GPRS, 3G, WIFI, Bluetooth, and the like) and are constantly connected to data services.

Most of the transit passengers carry at least one smart mobile device, and rather often more than one device. Passengers use their mobile devices to watch movies, play games, read books, work, listen to music, interact with social media, and the like. It is also no longer unusual for transit agencies to provide Wi-Fi services at their stations and/or on their service. Accordingly, the mobile devices became an integral part of the commute for many passengers.

The techniques and principles disclosed herein utilize the advancements in mobile technologies along with the increased use of mobile devices by the transit passengers to enable transit agencies to validate passengers using their services and facilitate fare calculations and payment collections. In particular, the disclosed methods, devices, and systems enable automatic detection of starting and ending points of passengers' journeys, tracking of the journeys, correlation of the detected journeys to existing transit routes, and automatic calculation of respective fares and payment collection. By incorporating the validation procedures and associated systems, devices, and methods described herein, the transit agencies will be able to increase their validation capacity, whilst maintaining accuracy or reliability of fare determination and payment collection processes. By enabling the transit agencies to automatically validate passengers' journeys and determine and process respective payments, in the manner described herein, entry/exit delays will be reduced, faults with the transit system will be decreased (such as due to a faulty ticket, missed validations), reliability will be improved, and transit agencies' resources will be conserved, also advantageously resulting in improved passenger experiences and additional user services being enabled. Furthermore, by implementing such a system, transit agencies can avoid/postpone large capital investments in station expansion, and likewise should be able to reduce customer service costs through reduced call centre enquiries for incomplete journeys.

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, combinations, and equivalents.

In the following description, numerous specific details are set forth in order to provide a thorough understanding of the various embodiments. However, the present invention may be practiced without some or all of these specific details. Further, well known process operations have not been described in detail in order to not unnecessarily obscure the present disclosure. Furthermore, each appearance of the phrase "example embodiment(s)," "illustrative embodiment(s)," "some embodiments" at various places in the specification does not necessarily refer to the same or different example(s) or illustrative embodiment(s), unless expressly specified.

As described herein, the term "passenger" refers to a person travelling on or otherwise using services of one or more transit systems. In the context of the present disclosure, this term is generally interchangeable with the terms "traveller," "customer," "user," "owner," "device holder," and "cardholder."

FIG. 1 shows an example of a mobile device 100 suitable to host and run a transit application 122 and a transit data processing engine 124 for facilitating the automatic detection and tracking of transit journeys made by the user of the mobile device, according to some embodiments. The mobile device 100 may be any mobile communication device that includes a plurality of sensors for sensing data associated with the movements, positioning, and/or locations of the device and is capable of hosting a mobile application and supporting data exchanges between the mobile application and a designated remote entity, such as a backend server.

Most smart mobile devices are suitable to host and support the transit application described herein since such devices are typically able to host and run multiple mobile applications, include communications interfaces for accessing the Internet and communicating with various networks and devices, and include a variety of built-in sensors for sensing the state of the device and its surroundings. These built-in sensors may include one or more motion sensors (such as an accelerometer, a gravity sensor, a gyroscope, and a rotational vector sensor), position sensors (such as orientation, proximity, and geomagnetic field sensors), environment sensors (such as light, pressure, humidity, and temperature sensors), location sensors (such as a GPS receiver and an electronic compass), audio sensors (e.g., a microphone), or video sensors (e.g., a camera).

Not every mobile device includes all the listed sensors. What sensors are included varies depending on the model and manufacture of a particular mobile device. However, as described in greater detail, for example, in respect of FIG. 3, different sensors are suitable to be employed for automatic detection and tracking of user's journeys and not all sensors need to be included in or used by a mobile device running the transit application. Rather, a few selected sensors are sufficient to acquire data that would enable detection and tracking of transit journeys, such as by the backend server or the transit data processing engine 124 of the mobile device. The transit application and/or methods employed by the backend server and/or the transit data processing engine 124) are adjustable to a particular device, for example, depending on what sensors that device includes, a desired level of accuracy for detecting and tracking transit journeys, a desired level of the power consumption by the mobile device, and/or the like.

Thus, the described techniques and principles are not limited to a particular type or model of the mobile device, and many modern mobile devices are suitable to be employed for automatically detecting, tracking, and validating the transit journeys of their users in accordance with the techniques and principles described herein. In some embodiments, the mobile device 100 is preferably a cellular communication device, such as a smart phone or other mobile device with a cellular interface. However, other types of mobile devices may be employed as well, such as a tablet, a laptop, or a smart watch, and/or the like.

The mobile device 100 shown in FIG. 1 generally includes one or more processors 110 operatively coupled to memory 120, a power source 130, input devices 140 (such as a keyboard, a touch screen, and/or the like), output devices 150 (such as a screen, a speaker, and/or the like), a communication interface 160, and a plurality of sensors 170. The processor 110 includes circuitry that implements communication and logic functions of the mobile device 100, such as a digital signal processor device, a microprocessor device, various digital to analogue and/or analogue to digital converters, and/or other support circuits for operating the components of the mobile device 100.

The memory 120 includes any computer readable non-transitory medium or the like configured to store data, code, and/or other information. For example, the memory 120 may include volatile memory, non-volatile memory, magnetic or optical storage devices such as disk drives, and/or other non-transitory media that are capable of storing code and/or data. The memory 120 can be embedded and/or be removable. The non-volatile memory may additionally, or alternatively, include an electrically erasable programmable read-only memory, flash memory, and/or the like.

The memory 120 is configured to store a number of applications or programs for operating the mobile device 100. The application and/or programs generally comprise computer-executable instructions/code which, when executed (operated, or the like) by the processor 110, implement the functions of the mobile device 100. For example as shown, the memory 120 may include the transit application 122, which when executed, performs one or more of the functions described herein, such as collecting data from the plurality of sensors 170 and selectively providing such data to the remote backend server. If the data tracking and journey detection are performed at the mobile device as well, instead of the remote backend server, the transit data processing engine 124 may also be deployed into the memory 120. The transit application 122, as well as any other application(s) stored in the memory 120, may provide a graphical user interface (GUI) on a display of the mobile device 100. For example, the GUI for the transit application 122 enables the user of the mobile device 100 to review transit journeys that have been detected by the transit application and corresponding fare payments, respond to prompts issued by the transit application, and/or the like (discussed in greater detail in respect of FIG. 3).

In the illustrative embodiments of FIG. 1, the processor 110 is further configured to enable the transit application 122 to communicate, through the communication interface 160, with a remote backend server, such as a journey detection server discussed below in respect of FIG. 2. The communication interface 160 includes an antenna operatively coupled to a transmitter and receiver 162. The processor 110 is configured to provide signals to and receive signals from the transmitter and receiver 162. These signals include signalling information in accordance with the air interface standard of the applicable cellular system of the wireless telephone network (such as a second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like) and/or in accordance with non-cellular communication mechanisms, such as via a wireless local area network (WLAN) or other communication/data networks.

The communication interface 160 further includes a Bluetooth interface 164 and a Wi-Fi interface 166 to enable the mobile device 100 to form and support communication channels under the Bluetooth and Wi-Fi protocols respectively to communicate with other devices and networks. As discussed in greater detail, for example, in respect of FIGS. 2 to 4, in some embodiments, the Wi-Fi and/or Bluetooth communication capabilities of the mobile device 100 are used to facilitate the automatic detection of transit journeys taken by the user of the mobile device and their tracking, such as to supplement geo-location determination based on data gathered by the GPS receiver.

The mobile device 100 has a user interface that includes input devices 140 for entering data by the user of the mobile device 100, for example, in response to prompts generated by the transit application 122. The user interface further includes output devices 150 for outputting data to the user of the mobile device 100, for example the prompts generated by the transit application 122 and information concerning the detected transit journeys and associated payment information. The user input devices 140 include, but are not limited to, any number of devices allowing the mobile device 100 to receive data from the user, such as a keypad, keyboard, touch-screen, touchpad, microphone, buttons, soft keys, and/or other input device(s). The user output devices 150 include, but are not limited to, a mobile display (e.g., a liquid crystal display (LCD), touch screen, or the like) and a speaker or other audio device(s).

The mobile device 100 further includes a power source 130 for supplying energy needed to operate the mobile device 100. The power source 130 includes, but is not limited to, a battery (e.g., a lithium battery, a nickel-metal hydride battery, or the like) and/or a power adapter that can connect a power supply from a power outlet to the mobile device 100.

The mobile device 100 also includes the plurality of sensors 170, built-in and/or external. Such sensors may include a GPS receiver 171, an accelerometer 172, a magnetometer 173, a gyroscope 174, and a microphone 175. Data sensed and gathered by the plurality of sensors 170 is accessed by the transit application 122 and provided, after being processed or raw, through the communication interface 160 to the remote backend server so as to facilitate determination and tracking of the travel journeys taken by the user of the device 100, for example, in the manner discussed in respect of FIG. 3. The data may be provided selectively, in accordance with a pre-determined schedule, and/or in response to requests sent to the mobile device 100 from the remote backend server.

Generally, each of the plurality of sensors 170 is configured to sense and gather data regarding motions, position, and/or location of the mobile device 100, surrounding environment and other parameters related to the mobile device and its state. More specifically, the GPS receiver 171 is configured to obtain geo-location data of the mobile device 100. However, the GPS receiver is typically not able to obtain the geo-location data in indoor environments, and its data may need to be supplemented by data acquired by other sensors, such as data concerning available Wi-Fi networks and associated received signal strength indications (RSSI), to ensure continuous availability of data in respect of the geo-location of the mobile device.

The accelerometer 172 is configured to measure acceleration of the mobile device relative to free fall and is useful at measuring the displacement of the mobile device (directional movement of the mobile device 100). The gyroscope 174 is configured to measure orientation of the device, based on the angular momentum, and is useful at detecting the spin movement of the mobile device (e.g., tilt of the mobile device). Both the accelerometer 172 and gyroscope 174 are able to return three-dimensional values.

The magnetometer 173 is configured to measure the strength and the direction of magnetic fields. Unlike the accelerometer 172 and gyroscope 174, which detect a direction of the mobile device's movement in relation to a coordinate system of the mobile device itself, the magnetometer 173 is able to detect an absolute direction of the mobile device in relation to the coordinate system of earth. The mobile device 100 may further include other (non-shown) motion sensors such as a gravity sensor, rotational vector sensor, or the like, and/or other (non-shown) position sensors, such as an orientation sensor.

The microphone 175 is configured to sense (pick-up) sounds, which are then analysed to predict, detect, or confirm a location and/or a surrounding environment of the mobile device at the time. Different locations are typically associated with different audio (sound/noise) patterns, noise levels, frequencies, and the like. For example, the noise pattern, level, and frequency of an underground train differ from those of a bus or an electrical vehicle. Analyses of the sensed audio data for pre-determined characteristics/criteria associated with different types of transit and other environments allows to predict, confirm or reject, and, in certain circumstances, detect the environment surrounding the mobile device at a point in time.

Using data from the GPS receiver 171, accelerometer 172, magnetometer 173, and gyroscope 174, microphone 175, and/or other sensors, the transit application 122 and/or the remote backend server (discussed in greater detail in respect of FIG. 2) are able to determine/estimate the movements of the mobile device 100 rather accurately, particularly when data from different sensors is used. The movements of the user carrying the mobile device 100 will generally correspond to and thus can be determined based on the detected movements of the mobile device 100.

In some embodiments, every time any of the plurality of sensors 170 detects a change in the parameters/data it is measuring, a sensor event is generated. In some other embodiments, sensor events are generated by some or all sensors, regardless of whether there is a change in their sensory parameters/data. For example, the sensor events may be generated at pre-defined times, such as periodically, in accordance with a pre-defined schedule or the like, or in response to pre-defined events, such as a sensor event generated by another sensor. The transit application 122 may also support a geo-fencing feature. Upon the mobile device crossing a certain geographical boundary (e.g., the mobile device entering an area within a pre-defined distance to a transit station), as determined based on the GPS and/or radio frequency identification (RFID) of the mobile device, a respective geo-fencing event/data is generated. Such a geo-fencing event may trigger selected or all sensors of the mobile device to gather their respective sensory data, generate their respective sensor events, and/or change frequency with which sensory data is gathered and sensor events are generated.

The sensor event generally identifies the sensor that triggered the event and includes a timestamp for the event, and the raw sensor data that triggered that event. It may further include details concerning the accuracy of the event. Such information is then provided to or accessed by the transit application 122, and then provided to the backend server. The information may be provided to the backend server after it has been processed by the transit application 122 or raw, as it was provided by the respective sensor.

Transmitting updates to the backend server every time a sensor event has been triggered may drain the mobile device's resources and power. Thus, in some embodiments, respective updates are transmitted to the backend server selectively, only when certain conditions are met (discussed in greater detail in respect of FIG. 3).

Figure 2:
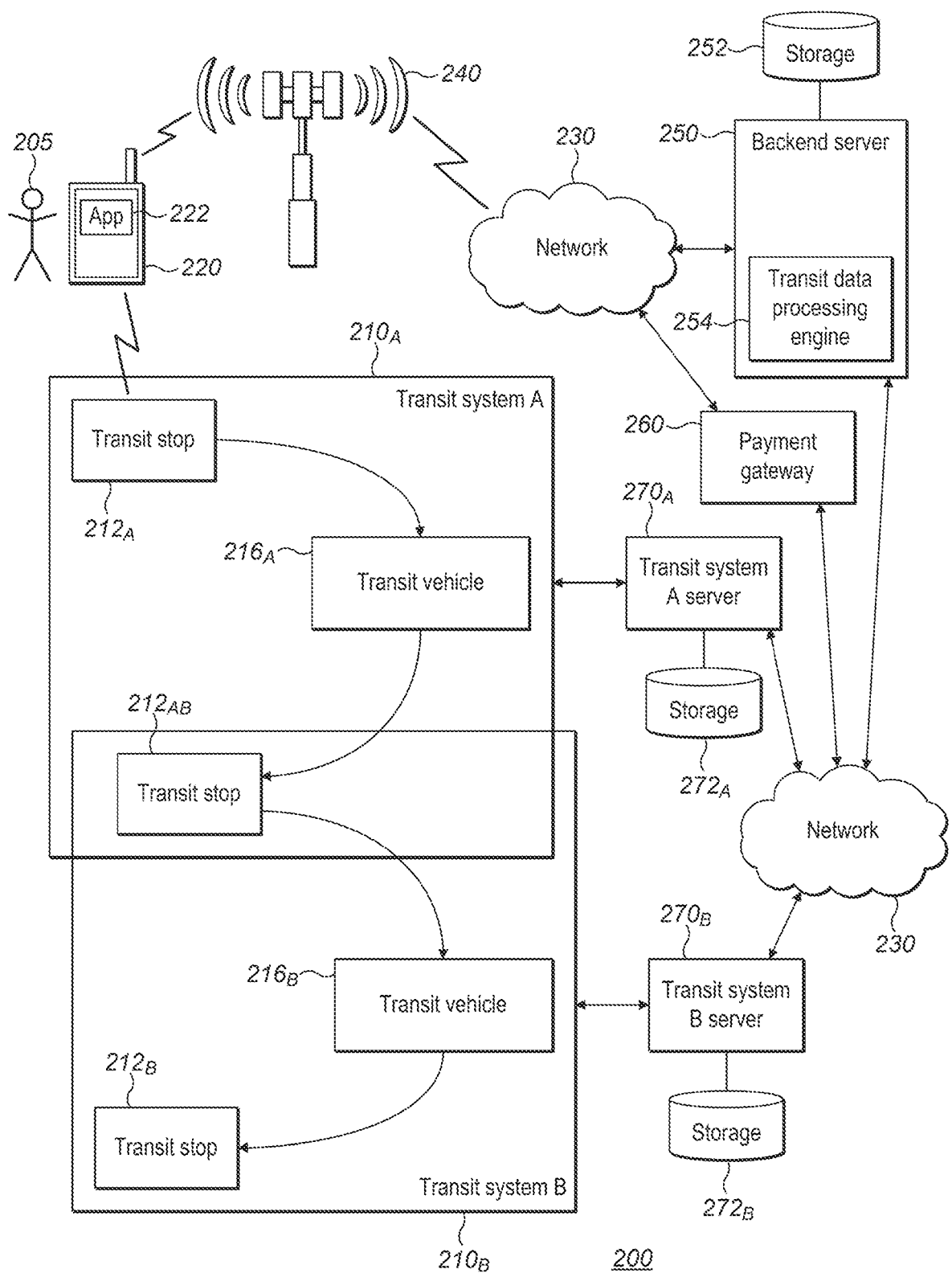
FIG. 2 shows an example of a system that automatically detects and tracks transit journeys of users of mobile devices running a transit application, in accordance with some embodiments.

Turning to FIG. 2, this figure illustrates a system 200 that automatically detects and tracks transit journeys taken by users of mobile devices registered for such a service, according to some embodiments. The system 200 also facilitates calculation of respective fares and payment collection. More specifically, the system 200 has the client-server architecture and includes a remote backend server 250 hosting a transit data processing and journey detection engine 254. The engine 254 is configured to analyse and integrate sensory data detected by and received from mobile devices that are registered for the journey detection, tracking, and validation services, such as a mobile device 220. The engine 254 is further configured to correlate such data with transit data, pre-determined (e.g., services timetables) and/or live updates (e.g., actual departures and arrivals) received from transit agencies subscribed for the journey detection and tracking services, such as a transit servers $270_A$ and $270_B$ of a transit system A $210_A$ and a transit system B $210_B$ respectively.

As shown in FIG. 2, the transit systems $210_A$ and $210_B$, transit servers $270_A$ and $270_B$, and mobile device 220 are all in communication with the backend server 250 and the engine 254 through various networks 230. By comparing, analysing, and correlating the sensory and transit data, the engine 254 is able to detect a potential transit journey, confirm the transit journey, including the starting point of the transit journey and time, track the transit journey progress, including the route of the journey, and detect and confirm that the transit journey has been completed, including the ending point and time, without requiring any input from the user 205 of the mobile device 220.

To facilitate payment collection by the respective transit agencies for the transit journeys detected by the engine 254, the engine 254 is in communication with a payment gateway 260 through the network 230. The engine 254 is configured to calculate respective fares, for example based on the starting and ending points of the transit journey, the taken route, the time when the transit journey occurred (travel time), and/or other data describing the transit journey, and in accordance with pre-defined fare calculation algorithms. Once a particular fare has been calculated, the engine 254 may request a respective payment to be processed by the payment gateway 260, for example, using a standard retail payment processing scheme for merchants. In some embodiments, the engine 254 is instead configured to employ an aggregation scheme for processing payments for the detected transit journeys.

In some embodiments, the engine 254 requests payment processing based on payment details stored for the user of the mobile device, such as payment details supplied by the user during registration for the transit journey detection/tracking/validation services. The payment details may include payment details associated with a regular payment card, a prepaid payment card, a virtual payment card, a tokenised payment, a bank account, and/or the like. In some embodiments, the engine/server 250 causes the transit application to prompt the user to make payments through the mobile device, for example using the transit application, a dedicated payment application, Digital Secure Remote Payment (DSRP) by MasterCard®, or the like. Which particular scheme or model is employed by the engine 254 to calculate fares and process respective payments may depend on the preferences of a particular transit agency.

Further, in some embodiments, the transit agencies are instead responsible for fare calculation and/or payment collection based on the data collected, processed, and provided by the engine 254 and do some in the manner described above in respect of the engine 254. Therefore, the transit agencies may also be in direct communication with the payment gateway 260, for example, by the means of the transit servers 270$_A$ and 270$_B$ and through the network 230.

The engine 254 is further configured to provide updates to the mobile device 220 in respect of the detected transit journeys and processed payments. The history of the detected journeys and processed payments may also be stored by the engine 254 or provided to a designated entity for storing and subsequent access by the registered users directly and/or through call centres of respective transit agencies.

To allow the system 200 to automatically detect, track, and validate transit journeys of the passenger 205 using the mobile device 220, for example, on the transit system 210$_A$ and 210$_{B1}$, the passenger 205 is required to install a specifically designed mobile application 222 on the mobile device 220, such as the transit application 122 discussed in respect of FIG. 1. The transit application 222 may, for example, be downloaded by the user 205 through a mobile platform for downloading and installing mobile applications, such as Apple's App Store, Google play, Windows Phone Store, or BlackBerry World. The passenger 205 is also required to register with the system 200, such as with the engine 254, and, at least due to the privacy concerns, grant permissions within the operating system of the mobile device 220 to allow the transit application to acquire data gathered by the sensors of the mobile device 220 and share such data with the engine 254 and to provide payment details/preferences. The passenger 205 may also be requested to grant permission to the respective mobile network operator to share cell locations of the mobile device 220 with the engine 254.

In some embodiments, the engine 254 is a third-party entity that provides the journey detection and tracking services to customers of multiple transit agencies that have subscribed for such services after such customers register with the engine 254. In some embodiments, however, the engine 254 is a designated server of a particular transit agency that provides the journey detection and tracking services to the customers of that transit agency only, or other transit agencies as well.

Yet in some embodiments, all or some of the functionalities described herein in respect of the engine 254, such as detection, tracking, and validation of transit journeys and fare calculations are implemented at the mobile device itself. For example, the mobile device may include a mobile version of the transit data processing engine (such as the transit data processing engine 124 shown in FIG. 1) that is in communication with or integrated within the transit application. In such embodiments, all the journey determination and calculation criteria and algorithms are stored locally at the mobile device, and may need to be updated on regular basis to ensure their accuracy. Further, to ensure reliability of the calculations performed within the transit application installed at the device, additional security measures may need to be implemented to prevent possible tampering with the application and/or to determine and indicate that the application may have been compromised.

To register with the system 200, the passenger 205 is requested to provide his or her contact details, set a password, give permissions to the transit application 222 to access data acquired by the sensors of the mobile device 220. The passenger may also be required to enter payment credentials, such as a payment card number, expiry data, and CVC2 or opt for in-app payments, such as using DSRP. Such information may, for example, be requested from the user 205 at the time that the transit application 222 is being installed or at a later set-up time.

Further, an additional security level in respect of the transit application's installation and/or registration is implemented in some embodiments. In particular the user 205 is required to confirm his or her registration, for example, via an email or by a text message, before approval of the registration is completed. For example, once the user 205 submits the requested registration information, the engine 254 generates a further request to confirm the registration. This further request is then transmitted to the mobile device 220 as a text message, and the mobile device registration is only confirmed after the user responds to the request using the mobile device.

Once the user 205 installs the transit application 222 on the mobile device 220 and registers for the journey detection, tracking, and validation services, the transit application 222 is ready to acquire data gathered by the sensors of the mobile device 220 and provide such data, processed or raw, to the engine 254. The transit application 222 runs in the background, obtaining and processing (parsing) the sensory data as needed, without obstructing the use of the mobile device 220 by the user 205. The mobile device 220 communicates with the engine 254 through a cellular network 240, which in turn forwards data from and to the mobile device 220 through the data network 230, enabling the transit application 222 to send and receive data to and from the engine 254. The sensory data acquired by the mobile device 220 may instead, or in addition, be sent through other communication channels, such as a Wi-Fi or Bluetooth network, for example, when the transit system $210_A$ or $210_B$ provides Wi-Fi or Bluetooth services at its stations or the mobile device 220 is in the area of a Wi-Fi or Bluetooth network.

When the transit application 222 starts running, it automatically identifies the sensors built into the mobile phone hardware. Each sensor may be enabled only if it is supported by both hardware and software layers. Once registered, the transit application 222 is able to provide data concerning the available sensors to the engine 254, which in response may return instructions identifying the sensors of the mobile device 220 that should be used to gather data and the sensing frequency or schedule for data gathering. For example, the mobile device 220 may be configured to sense only a GPS location. In another instance, the mobile device 220 may be configured to sense a GPS location of the mobile device, and accelerometer and gyroscopic values. The transit application 222 and the backend engine 254 can handle any of these configurations.

Generally, by increasing the number of different sensors of the mobile device that are employed by the transit application 222, and thus the variety of the data gathered about the mobile device and its user, accuracy of the detection and tracking services provided can improved and the possibility of incorrect charges can be minimised. In some embodiments, one or more minimum configurations that are required to enable reliable services by the transit application 222 are pre-defined. Only when one of such configurations is met, the user will be able to benefit from the detection, tracking, and validation services provided by the transit application 222. The transit application 222 can dynamically change its internal data structures to facilitate any sensing scenario, and in response to the commands issued by the engine 254. In some embodiments, the user 205 of the mobile device 220 is enabled to set preferences concerning what sensors may be used by the transit application 222.

Figure 3:
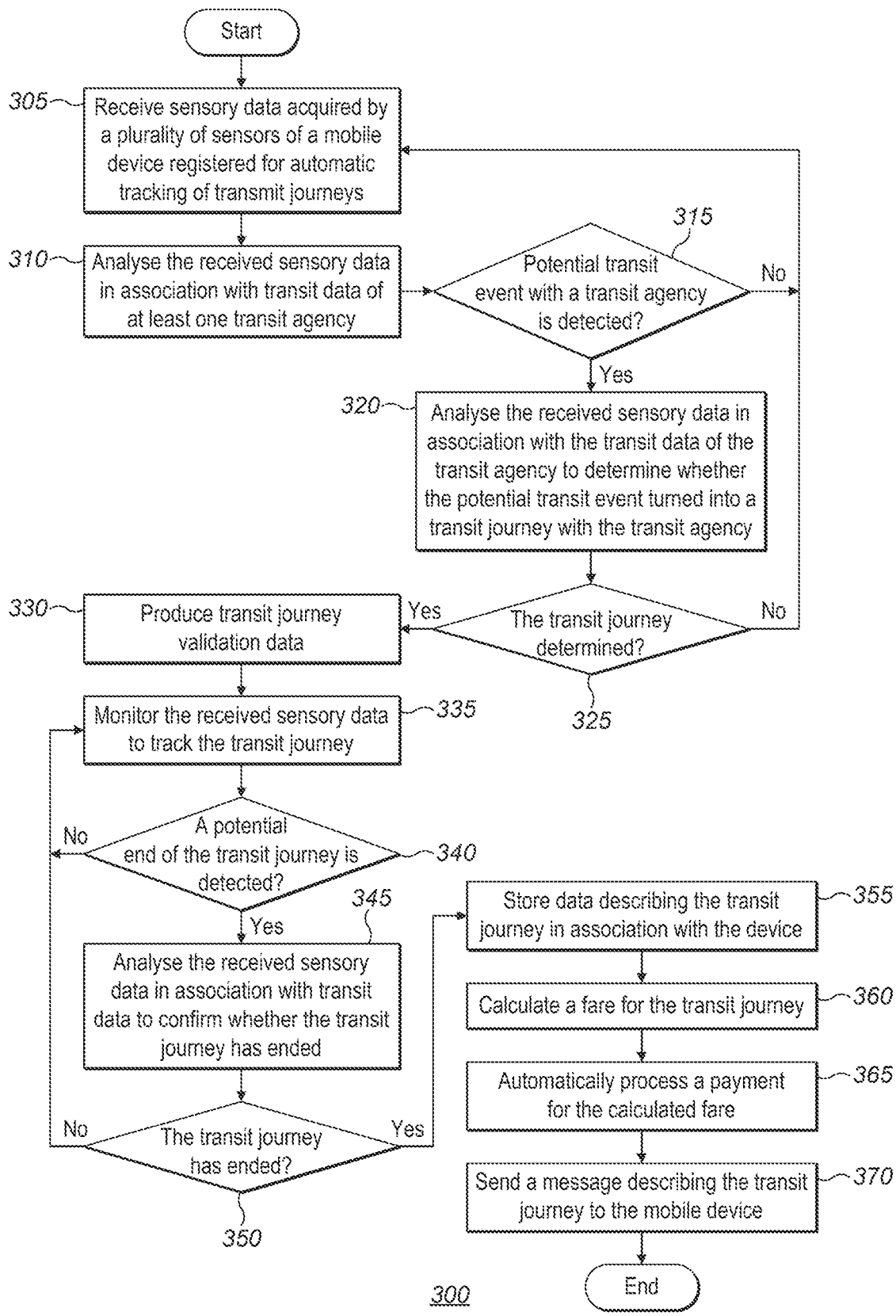
FIG. 3 depicts a method for automatically detecting, tracking, and validating transit journeys, in accordance with some embodiments.

As discussed in greater detail in respect of FIG. 3, using the received sensory and transit data, the engine 254 detects and confirms a starting point of the user's journey within a transit system, e.g., a transit stop or station $212_A$ of the transit system A $210_A$, and then tracks the user's journey (e.g., determines that the mobile device 220 is on board of the transit vehicle $216_A$ as the transit vehicle $216_A$ moves along a pre-determined route; detects geo-locations of the mobile device 220 along the transit route) until it detects, and then confirms, the ending point of the transit journey, e.g., a transit stop $212_{AB}$ of the transit systems A $210_A$ and B $210_B$ or a transit stop $212_B$ of the transit system B $210_8$. In some embodiments, the engine 254 evaluates travel journeys within different transit systems (with different transit agencies) independently. For example, if the user 205 travelled from the transit stop $212_A$ to the transit stop $212_B$ in one go, because this journey required the user to leave one transit agency, i.e., the transit system A 210A, and then continue the journey with another transit agency, i.e., the transit system B 210B, the engine 254 will view such a journey as two, one within the transit system A 210A and another one within the transit system B 210B. In some other embodiments, as long as the user continues with the journey, regardless of with how many transit agencies, the engine 254 evaluates such a journey as a single journey, keeping record of user's interchange point(s).

Once the transit journey has been completed, the engine 254 calculates the appropriate fare for the journey. The engine 254 sends a respective update to the transit application 222 on the mobile device 220 concerning the detected transit journey taken by the user 205, and processes a payment for the determined fare through the payment gateway 260, such as by submitting the calculated fare and the user's payment credentials to the payment gateway 260.

In some embodiments, the engine 254 is further configured to push various alerts to the user 205 through the mobile device 220. These alerts may take a form of push alerts, email alerts, text message (SMS) alerts, or alerts issued within the transit application 222. The alerts may be prompts requiring the user 205 to respond. For example, the user 205 may be required to confirm the start and/or end of the transit journey, the fare calculated for the transit journey, that a particular transaction (e.g., a payment transaction) took place, and/or the like. The alerts may also be informative and not require a user response, e.g., to inform the user 205 that the payment transaction for the transit journey was declined and no further payment transaction will be allowed, inform the user 205 that she or he appears to have started a transit journey with a mobile device that is 'blocked' because of previous declined transactions, or simply to reassure the user that the transit application is working as expected, e.g., by showing that a transit journey has started, is in progress, finished, and/or the like.

FIG. 3 show a flow diagram of a method 300 for automatically detecting, tracking, and validating transit journeys, in accordance with some embodiments. The method 300 is generally described as being executed by a backend server, such as the backend server 250 with the transit data processing engine 254 discussed in respect of FIG. 2, whether such a backend server is a third-party provider or a transit agency. However, in some embodiments, some or all of the steps described in respect of FIG. 3 are performed at the mobile device instead, for example, by a transit data processing engine, such as the engine 124 discussed in respect of FIG. 1.

The method 300 starts at step 305, at which sensory data is received from a mobile device, which has been registered for automatic detection, tracking, and validation of transit journeys taken while carrying the mobile device. The sensory data is gathered by a plurality of sensors of the mobile device and, as discussed herein, may include location, position, and/or orientation data of the mobile device. Generally, in accordance with the method 300, the sensory data gathered by different sensors of the mobile device is integrated and analysed (parsed) along with transit data regarding services of a transit agency (transit operator) or agencies to detect, track, and validate transit journeys taken by the user of the mobile device. As discussed herein, generally, more than one sensor would be required to gather the data in order to provide a reliable system.

More specifically, in some embodiments, the sensory data is acquired by the mobile device, and thus received by the backend engine, in accordance with a predetermined schedule. For example, the sensory data may be acquired and received at certain time intervals and/or during certain times of day, such as during times set by the user of the mobile device. The user may elect to rely on the automatic detection, tracking, and validation services only during his or her regular commute hours, and use a more traditional approach to validate his or her travels at other times. In some embodiments, a transit application, installed and running on the mobile device to facilitate the automatic detection, tracking, and validation services, learns over time typical transit hours/days of the mobile device (e.g., the commute hours of the user) and gathers and transmits the sensory data to the backend server regularly only during those hours, and more sporadically or not at all at the remaining times. In some embodiments, the backend server pings the transit application to gather and transmit the sensory data.

Gathering and/or transmission of the sensory data may also be event driven. For example, in some embodiments, data concerning cell locations and/or GPS data of the mobile device is constantly received and analysed by the backend server. Once the backend server determines that the mobile device is in certain proximity of a transit station (stop) (e.g., within a pre-defined distance of a geo-location of the transit station), the backend server sends a request to the transit application of the mobile device to commence gathering and transmission of the sensory data by the mobile device itself. If no transit journey is subsequently detected and the mobile device leaves the proximity of the transit station, the backend server sends another request to the transit application to stop gathering and transmission of the sensory data.

In some embodiments, such gathering and/or transmission of sensory data are instead controlled using a geo-fencing feature of the transit application. For example, perimeters (geo-fences) may be pre-defined within the transit application in association with relevant transit locations (e.g., transit stops). Once the transit application determines, based on GPS, RFID, and/or location data, that the mobile device crossed one of the predefined geo-fences, an event is generated to trigger other sensors of the mobile device to start gathering their respective sensory data.

In some embodiments, the determination that the mobile device is in proximity of the transit station is performed by the transit application itself. For example, the transit application may maintain data concerning locations of the transit stations for certain areas or employ services of a mapping application also installed on the mobile device to make determinations concerning transit stations located nearby. In some embodiments, at least some transit stations of a transit agency are equipped with Wi-Fi networks and/or Bluetooth beacons/receiver (also discussed in respect of FIG. 4). Once such a Wi-Fi network or Bluetooth beacon is detected by the mobile device, the transit application determines that the mobile device is in the proximity of the transit station and commences gathering and transmission of the sensory data to the backend server at intervals (regular, random, or event or change driven) for analysis and automatic journey detection, tracking, and validation.

In some embodiments, when the transit application is initialised/started, it gathers and transmits only selected type(s) of sensory data, such as geo-location data sensed by the GPS receiver, until the backend server detects a potential transit event (step 315). Once the potential transit event has been detected, the transit application commences gathering and transmission of additional sensory data, such as data of the accelerometer and gyroscope of the mobile device. If the potential transit event is confirmed as a transit journey (step 325), the transit application continues with the gathering and transmission of the broader set of sensory data. However, if the backend server is not able to confirm a transit journey, the transit application returns to gathering and transmission of a reduced set of the sensory data to the backend server, until another potential transit event is detected.

Therefore, detection of the potential transit event can trigger an adjustment to a reporting protocol in accordance to which the sensory data gathered by the sensors of the mobile device is reported to the backend server. If the potential transit event is not confirmed, the adjustment is reverted. Additionally, or alternatively, the frequency with which the sensory data is gathered and/or reported can be adjusted to increase once the potential transit event is detected, and to decrease if the potential transit event is not confirmed. Similar adjustments to the reporting protocol can be made utilizing the geo-fencing feature of the transit application in response to detecting that the mobile device entered/exited a pre-defined geo-fence area.

Employing the event driven approach, or a combination of the event driven and schedule driven approaches to gathering and transmission of the sensory data by the mobile device enables the mobile device to conserve its resources, including battery and power, because unnecessary data gathering and transmissions are avoided. In the context of this disclosure, geo-fencing is considered to be an example of the event driven approach.

At step 310, the received sensory data is analysed in association with the transit data of one or more transit agencies to determine potential transit events. The transit data describes services provided by the transit agencies, such as types of services, modes of transportation, transit stops/stations and their locations, interchanges, routes, timetables, and/or the like. The transit data may further include live updates regarding the current status of the transit services, including delays, actual departure and arrival times, detours, and/or the like. If the backend server belongs to a particular transit agency, the method 300 is performed may be, but not necessarily, performed in respect of transit services of that transit agency only, and thus refer to the transit data in respect of the services provided by such an agency only.

Generally speaking, at step 310, the received sensory data is compared to the transit data to determine whether the user is at a possible starting point of a transit journey. For example, if the received geo-location of the mobile device, as determined by the GPS receiver of the mobile device, corresponds to a location of one of the transit stations (e.g., a train or bus stop) or is within a pre-defined distance from such a location (e.g., within 5 meters from the transit station), the user may potentially be at the beginning of his/her transit journey. The possibility that the user is at the beginning of a transit journey is a potential transit event. If, based on the received sensory data, no potential transit event is determined (step 315), the method 300 returns to step 305, where further sensory data is received from the mobile device.

When the potential transit event is detected or otherwise determined, the method 300 proceeds to step 320, at which the backend server continues to analyse the sensory data being received from the mobile device in attempt to confirm that the potential transit event turns into (becomes, defines) a transit journey. For example, the closer the geo-location of the mobile device is to the location of the transit station or stop, the higher is the probability that the user is about to start a transit journey and that the transit station is the starting point of the journey. Thus, the sensory data indicating the user's approach to the transit station (such as the geo-locations of the mobile device progressing towards the geo-location of the transit station) may serve as confirmation that the potential transit event defines the transit journey.

A geo-location of the mobile device corresponding to a location of a transit station does not necessarily however equate to the user using a respective transit service. For example, it is common for taxis to queue next to transit stops, and such a queue may be the sole reason for the user coming to the transit stop. Therefore, typically additional data, such as the sensory data acquired by other sensors of the mobile device, is sought by the backend server to confirm that the potential transit event turned into the transit journey.

Data sensed by an accelerometer and/or a gyroscope may be used to estimate modes of transportation used by the user of the mobile device, for example, whether the user continues walking, or travels on the bus, train, or some other type of transport. Further, the movements of the mobile device may be traced based on the data gathered by the accelerometer and gyroscope, whilst being periodically corrected based on the GPS data. On the other hand, the accelerometer may be used as a supplement for the GPS localization to measure the acceleration, velocity, and turns. Therefore, the backend server is able to determine when the user changes the mode of transportation and estimate the new mode of transportation based on the sensory data gathered by the accelerometer (and the gyroscope) of the mobile device. By confirming that the estimated mode of transportation corresponds to the mode of transportation departing from the transit stop where the mobile device has been detected, the backend server is able to confirm that the potential transit event defines the transit journey.

In some embodiments, the transit agency provides the Wi-Fi and/or Bluetooth services at its stops, such as Wi-Fi access within a transit station. By employing resources provided by such services in combination with the sensory data acquired by the mobile device, a more precise determination (with the higher degree of certainty) as to whether the user of the mobile device has started his or her transit journey may be achieved. For example, a confirmation that the mobile device is within a reception area of a Wi-Fi router accessible only inside a transit station (e.g., in an entry or departure area), or/and that the received signal strength indication (RSSI) of the Wi-Fi network provided by the transit agency within the transit station is detected by the mobile device at the highest level confirm that the potential transit event defines the transit journey and the transit station is the starting point of the transit journey.

Figure 4:
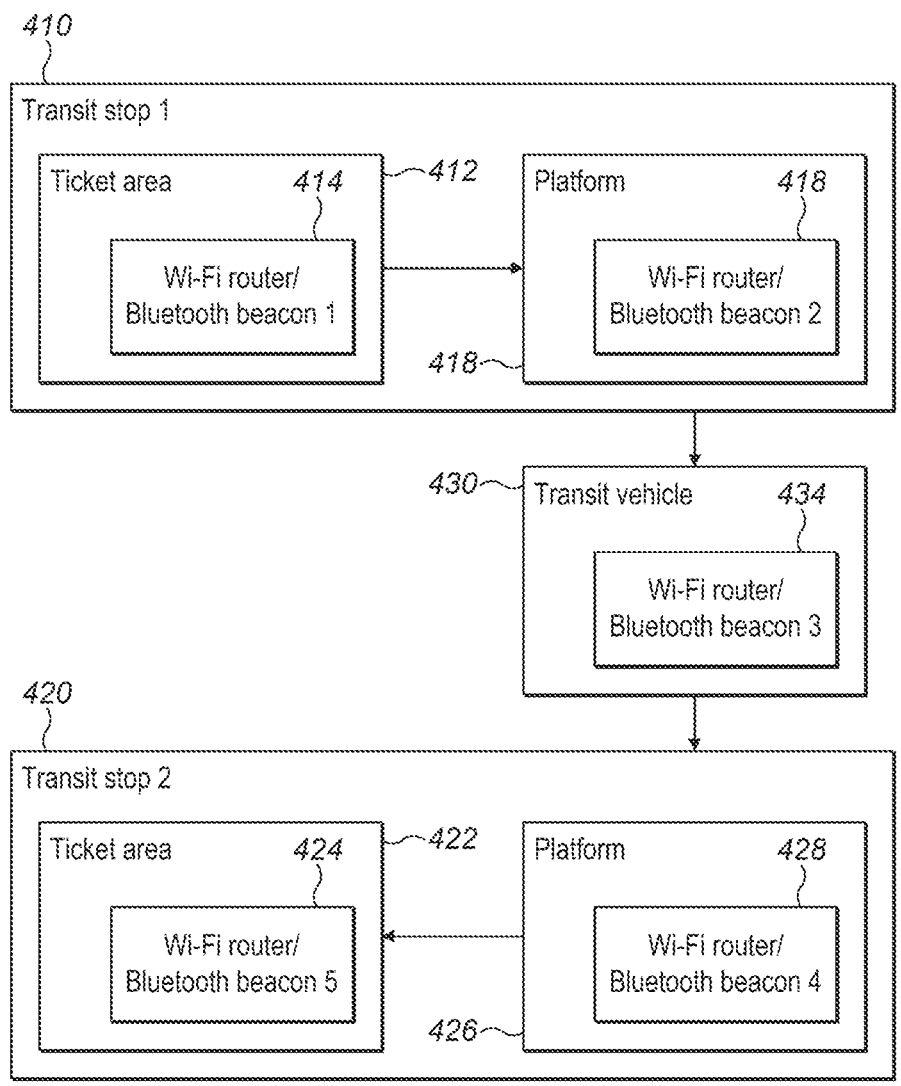
FIG. 4 shows some details of a transit system that enables automatic detection and tracking of transit journeys taken by its passengers, in accordance with some embodiments.

Bluetooth receivers or beacons, strategically placed at transit stations may be used in a similar manner, and provide the backend server with an alternative or additional confirmation that the potential transit event defines the transit journey. FIG. 4 shows some details of a transit system 400 providing the Wi-Fi and/or Bluetooth services at least at some of its stations, and illustrates a scenario where such services are used to facilitate determination of whether the user embarked on the transit journey.

More specifically, the illustrative transit system 400 includes at least two transit stops 410 and 420 and some transit stops (not shown) in between these two stops. Each of the transit stops 410 and 420 has an entry/exit area (e.g., a ticket area), areas 412 and 422 respectively, and a departure and/or arrival area(s) (e.g., a platform area), areas 416 and 426 respectively. Each of these areas is equipped with either a Wi-Fi router or a Bluetooth beacon/receiver designated as 414, 418, 424, and 428.

As the user approaches the transit station 410 or 420 and enters the respective entry (ticket) area, the mobile device (assuming it has the requisite capabilities) is able to detect the ticket area Wi-Fi router (or Bluetooth beacon) 414 or 420 respectively. Once the mobile device detects the router (or beacon) 414 or 420 and provides the respective data to the backend server, the backend server, based on such information, is able to determine a potential transit event. The backend server then continues to monitor and analyse the sensory data being provided by the mobile device along with other data to determine whether the potential transit event becomes a transit journey. If then the mobile device detects the departure area router (or beacon) 418 or 428 and provides the respective data to the backend server, the backend server is able to determine that the potential transit event became the transit journey.

In some embodiments, transit vehicles of the transit agency (e.g., a bus, a train carriage, or the like), such as a transit vehicle 440, are equipped with Wi-Fi routers (or Bluetooth receivers), such as a router/receiver 434. Once on board of the transit vehicle, the mobile device is able to detect/sense the respective Wi-Fi router (or Bluetooth beacon/receiver). Accordingly, the mobile device provides the corresponding data to the backend server, who interprets such data as the confirmation that the potential transit event defines the transit journey. Additionally, if the transit vehicle is on the move and the mobile device remains within the reception area of the Wi-Fi router, the movement of the mobile device may be tracked in accordance with the movement of the transit vehicle and based on the transit data.

In some embodiments, in addition to, or instead of, the mobile device sending, to the backend server, data regarding the proximity (range, availability) of the Wi-Fi router (or the Bluetooth beacon or receiver) 414, 418, 434, 422, or 428, the Wi-Fi router (the Bluetooth beacon or receiver) 414, 418, 434, 422, or 428 is configured to provide data regarding mobile devices within its reception/range area to the backend server. The backend server is able to parse such data to detect data relevant to a particular mobile device and then confirm that the potential transit event determined for that mobile device turned into the transit journey. Additionally, or instead, cell locations of the mobile device provided to the backend server by either the mobile device or the respective mobile network operator are used in some embodiments to pinpoint the current location of the mobile device and increase the certainty of whether the potential transit event defines the transit journey.

Returning to FIG. 3, in some embodiments, the transit application generates a prompt, either independently, or in response to a respective request from the backend server, requesting the user of the mobile device to confirm that he or she started the transit journey. The prompt identifies the transit stop as the starting point of the journey and may include additional information such as current time. The user response is returned by the transit application to the backend server. The affirmative response enables the backend server to confirm the transit journey, whilst the negative response causes the backend server to seek new potential transit events.

If, at steps 320 and 325, the backend server is not able to confirm that the potential transit event became a transit journey, the method 300 returns to step 305 where further sensory data is received from the mobile device and parsed to detect new potential transit events. If, at steps 320 and 325, the backend server successfully confirms, at least to some degree of certainty, that the potential transit event defines the transit journey, the method 300 proceeds to step 330.

At step 330, a validation data, e.g., a code, validating the user's transit journey is generated or otherwise produced. The validation code can be inspected, for example, by the transit agency staff and confirms that transit journey has been detected and the user is allowed to travel. Thus, the validation code confirms that the passenger has a correct ticket for his/her journey. The validation code may be generated by the transit application itself, in accordance with a predefined algorithm, or provided to the mobile device by the backend server. The validation code may take a form of a scanable Quick response (QR) code or a barcode for displaying on the mobile device, for example, within the transit application. It may also take a form of a digital watermark, a text message, e-ticket, or the like. In some embodiments, the validation code is not displayed, but is rather stored at the mobile device, and is readable using an NFC reader. In this manner, the user's transit journey has been validated and the transit agency staff may confirm such validation. Thus, although the end point of the transit journey may still be unknown, the user of the mobile device has been validated for travel.

At step 335, the sensory data being received is monitored to track the progress of the detected transit journey and to detect a potential ending point of the transit journey. Methods, similar to those discussed above in relation to detection of a potential transit event and confirmation of such an event as a transit journey, are generally used. The received sensory data is analysed/parsed by the backend server to determine the movement of the mobile device, for example its progress along a particular route as defined by a series of detected locations (such as geo-location data and networks-based location data), which is then correlated to the known routes of the transit agency as defined by the transit data to estimate what transit route the user has taken. In some embodiments, the series of locations is also compared to the timetable and/or live updates to further increase the certainty that the user follows the estimated transit route.

The sensory data gathered by the accelerometer of the mobile device may be used to determine the speed of movement of the mobile device. The determined speed of movement of the mobile device is then compared, in some embodiments, to the anticipated (estimated) speed of the detected transportation mode, such as to an average speed of a train, bus, tube, and the like. Statistically significant discrepancies between the anticipated (predicted/estimated, average) and actual speeds along the estimated route would indicate to the backend server that the estimated transit route is incorrect, or in case of different types of transport essentially following the same route will allow the backend server to narrow the estimate to a single type/mode of transport. On the other hand, lack of significant discrepancies between the anticipated and actual movement speeds further increases the certainty in respect of the detected route e.g., when the difference between the estimated and actual movement speeds is within a predefined margin. Different margins may be defined for different modes of transportation, e.g., the margins may be larger for faster-moving transit vehicles.

If the sensory data indicates that the mobile device is stationary for a prolonged period of time whilst being located between transit stops, the backend server may seek to confirm delays in route, for example, using the real-time transit updates from the respective transit agency. If no delays were reported, a prolonged stationary period between the stations indicates that the transit journey estimate/determination was incorrect. Similarly, although the sensory data may indicate that the mobile device proceeds along an existing transit route, if the mobile device follows that route during times when no transit service is scheduled, e.g., at night, no transit journey should be determined.

By analysing the sensory data acquired by the plurality of sensors and correlating such data with the transit data (service data of the transit operator/agency), pre-set and/or real-time (live), transit journeys taken by the user of the mobile device may be determined with a reasonable degree of certainty. The greater the number of the confirmation points is, the stronger is the certainty that a correct transit journey was determined.

A potential ending point is generally determined in the manner somewhat similar to how a potential transit event is determined. For example, the mobile device reaching a transit stop or detecting a Wi-Fi network/Bluetooth beacon located at the transit stop (e.g., in a departure/arrival area), after the transit journey has started, indicate a potential ending point of transit journey. If the potential ending point is detected (step 340), the received sensory data is further analysed in association with the transit data to confirm whether the transit journey has ended (step 345). This step is generally performed in a manner similar to how it is determined that a potential transit event has turned into a transit journey, although in somewhat reversed order. For example, if the sensory data received after the mobile device reached the transit stop does not indicate that the mobile device continued along the transit route and/or started moving approximately at the estimated speed of the detected transportation mode, the backend server confirms that that the transit journey has ended and the potential ending point is the end of the transit journey.

Referring to FIG. 4, if the mobile device detects first a Wi-Fi router (Bluetooth beacon) located at the arrival area (such as a platform), e.g., the router 418 or 428, and then detects a Wi-Fi router (Bluetooth beacon) located at the exit area (e.g., a ticket area), e.g., the router 414 or 424 respectively, the backend server, after receiving such information, is able to determine that the transit journey has ended.

Depending on a particular implementation and preferences of transit service provider(s), for a single journey that includes interchanges within the same transit system and/or interchanges between different modes of transportation or different transit systems, different legs of such a transit journey may be treated by the backend server as multiple transit journeys or be combined into a single journey. Thus, in some embodiments, a potential ending point that has been confirmed as the end of the transit journey, may subsequently be reclassified into an interchange point, if for example, the subsequent movements of the mobile device indicate that the transit journey was continued on a different transit vehicle, on a different type of transport, or with a different operator.

Once the determination is made that the transit journey has ended (step 350), the method proceeds to step 355, at which data describing the detected transit journey is saved and stored in association with the mobile device and/or the user of the mobile device. Generally, the data selected to be stored in respect of a particular detected transit journey should be sufficient to allow the respective transit agency to confirm, show, or otherwise explain to the passenger, in the meaningful way, what the detected transit journey was and how the determination that the user took this transit journey was made. Such data may include the starting and ending points of the transit journey, the mode of transportation, when it occurred, the transit service matched to the transit journey, geo-locations of the mobile device at the starting and ending points and along the route with corresponding travel times, the mobile cell locations at given times and days confirming that the device was used at the respective locations, and/or other data. Thus, data stored in relation to each detected transit journey should allow the transit agency to justify the determined transit journey and the associated payment, if any, with a reasonable degree of certainty, in case the user disputes the payment, or that he took the transit journey.

In some embodiments, to enable the transit agency to resolve disputes in relation to the transit journeys detected by the backend server based on cell locations data, a purpose built application program interface (API) is implemented between the backend server and mobile network operators supporting the mobile devices registered with the backend server for automatic journey detection, tracking, and validation. Using this API, the backend is able to access additional information regarding the mobile device use that is not necessarily stored by the backend server in relation to the detected transit journeys and respond to users' queries regarding the determined journeys.

At step 360, a fare for the transit journey is calculated. Typically, the fare calculation is based on the starting and ending points of the transit journey, the associated transit route, and the time of travel. Such data is plugged into a fare calculation algorithm associated with the respective transit agency. The outcome of such an algorithm is the fare amount to be charged to the user.

In some embodiments, if the user is a season ticket holder, first a determination is made regarding whether the detected transit journey falls within the area covered by the season ticket and allowed travel times. If the transit journey falls within the boundaries of the season ticket, such as the covered area and associated time and/or other limits, the calculated fare is zero and no payment is required. In such circumstances, the payment processing step 365 is skipped and the method 300 proceeds directly to step 370. However, if the transit journey falls outside the season ticket's boundaries, the fare for the transit journey is calculated in the manner described above.

At step 365, a payment for the calculated fare amount is processed. In some embodiments, the payment is processed using the payment credentials associated with the mobile device (such as the payment credentials submitted by the user at the registration) in accordance with the standard payment processing procedures, such as the retail payment processing or aggregation scheme. For example, once the fare amount has been calculated, it can be submitted along with the payment credentials to the payment gateway for processing. Alternatively, the calculated fare amount may be added to the outstanding amount associated with the user account, which is then submitted to the payment gateway for processing along with the payment credentials once a pre-set aggregation amount is reached.

In some embodiments, the payment is processed through the mobile device instead. For example, the transit application may prompt the user to make payments using a dedicated payment feature of the transit application, a dedicated payment application also installed on the mobile device, DSRP by MasterCard®, or the like.

At step 370, data describing the transit journey is transmitted to the mobile device. Such data may indicate the starting and ending points of the transit journey, the transit route, associated travel times, and data concerning the processed payment, if any. The data may be transmitted as a text message (e.g., an SMS message), as an update to the transit application for subsequent access by the user, as in-app message to be displayed by the transit application, as an email, or by some other means. Additionally, or instead, such data can be made available to the passenger by calling to a call centre and/or accessing a dedicated website.

The methods described herein may be encoded as executable instructions embodied in a computer readable medium, including, without limitation, non-transitory computer-readable storage, a storage device, and/or a memory device. Such instructions, when executed by a processor (or one or more computers, processors, and/or other devices) cause the processor (the one or more computers, processors, and/or other devices) to perform at least a portion of the methods described herein. A non-transitory computer-readable storage medium includes, but is not limited to, volatile memory, non-volatile memory, magnetic and optical storage devices such as disk drives, magnetic tape, CDs (compact discs), DVDs (digital versatile discs), or other media that are capable of storing code and/or data.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

The order of execution or performance of the operations in the embodiments illustrated and described herein is not essential, unless otherwise specified. That is, the operations/steps may be performed in any order, unless otherwise specified, and embodiments may include additional or fewer operations/steps than those disclosed herein. For example, a particular selected order of steps of methods described in relation to FIG. 3 may depend on preferences and/or technical specifications of the remote backend server executing the method or preferences of a particular transit agency whose service the remote backend server and the executed method support. It is further contemplated that executing or performing a particular operation/step before, contemporaneously with, or after another operation is in accordance with the described embodiments.

While the invention has been described in terms of various specific embodiments, the skilled person would recognize that the invention can be practiced with modification within the spirit and scope of the claims.

What is claimed is:

1. A computer implemented method of automatically tracking a mobile device through a transit system, the method comprising:
receiving, at a transit data processing engine, sensory data gathered by a plurality of sensors of the mobile device registered for automatic tracking of transit journeys, the sensory data comprising at least one of data from an accelerometer and data from a gyroscope, the mobile device executing a transit application providing the sensory data concerning the plurality of sensors to the transit data processing engine, the providing of the sensory data to the transit data processing engine being performed regularly during a transit time of the mobile device and sporadically during other times, the transit time being learned by the mobile device;

detecting, by the transit data processing engine, based on transit data received from one or more transit system servers and a first set of the sensory data, a starting point of a transit journey within the transit system, wherein detecting the starting point comprises determining that audio data of the first set of the sensory data, the audio data being a representation of audio, has one or more pre-determined audio characteristics that identify the transit station;

determining, by the transit data processing engine, based on the transit data and a second set of the sensory data, a transit stop of the transit journey within the transit system, wherein the second set of the sensory data is received from the mobile device subsequently to the first set of the sensory data;

analysing, by the transit data processing engine, sensory data gathered by and received from the mobile device subsequently to the second set of the sensory data to detect an ending point of the transit journey;

correlating the transit journey having the starting point and the ending point gathered by the mobile device to an existing transit route to automatically calculate a respective fare; and collecting a payment for the transit journey.

2. The method according to claim 1, further comprising:
generating validation data confirming the transit journey, comprising one or more of: an e-ticket for displaying on the mobile device, a QR-code for displaying on the mobile device, a barcode for displaying on the mobile device, or a validation code for storing in NFC readable memory of the mobile device.

3. The method according to claim 1, wherein at least one of the first set of the sensory data, the second set of the sensory data, and the sensory data gathered and received subsequent to the second set of the sensory data comprises two or more of: a geo-location of the mobile device determined via a Global Positioning System, an identification of a Wi-Fi network available to the mobile device, a received signal strength indication (RSSI) associated with the available Wi-Fi network, and an identification of a Bluetooth beacon.

4. The method according to claim 1, the method further comprising one or more of:
determining that the sensory data, subsequent to the second set of the sensory data, comprises one or more geo-locations of the mobile device that correspond to one or more geo-locations along one or more transit routes supported by one or more transit agencies, wherein each of the one or more transit routes includes the starting point,
determining that the sensory data, subsequent to the second set of the sensory data, comprises one or more geo-locations of the mobile device that correspond to geo-locations along a transit route supported by the one or more transit agencies and were gathered at times in agreement with one or more of a timetable of the transit route or real-time transit updates for the one or more transit agencies in association with the transit route,
determining that the mobile device is able to access a Wi-Fi network or Bluetooth beacon accessible from a departure area of a transit station of the one or more transit agencies,
determining that the mobile device is able to access a Wi-Fi network or Bluetooth beacon accessible from a transit vehicle of the one or more transit agencies,
determining that a speed of movement of the mobile device corresponds to an estimated speed of a transit vehicle on an estimated transit route with the one or more transit agencies, the estimated transit route including the starting point, or
receiving an indication of the transit journey based on user input at the mobile device.

5. The method according to claim 1, wherein analysing the sensory data to detect the ending point of the transit journey comprises:
correlating, based on the transit data, the sensory data being received to one or more transit routes of one or more transit agencies comprising the starting point to detect the ending point of the transit journey on one of the one or more transit routes.

6. The method according to claim 5, wherein analysing the sensory data to detect the ending point of the transit journey further comprises:
detecting the ending point of the transit journey along the one or more transit routes in response to determining one or more of:
that the set of the sensory data gathered by and received from the mobile device subsequently to the second set of the sensory data comprises a geo-location of the mobile device that corresponds to a geo-location of a transit station of the one or more transit agencies along the one or more transit routes,
that the set of the sensory data gathered by and received from the mobile device subsequently to the second set of the sensory data indicates that the mobile device was able to access a Wi-Fi network or a Bluetooth beacon accessible from an arrival area of a transit station of the one or more transit agencies along the one or more transit routes, or
that the set of the sensory data gathered by and received from the mobile device subsequently to the second set of the sensory data indicates that the mobile device stopped moving along the one or more transit routes of the one or more transit agencies; and
analysing the sensory data received subsequently to the second set of the sensory data to confirm whether a potential ending point is the ending point of the transit journey.

7. The method according to claim 6,
wherein the potential ending point is a transit station of the one or more transit agencies that corresponds to a geo-location of the mobile device indicated by the set of the sensory data gathered by and received from the mobile device subsequently to the second set of the sensory data; and
wherein confirming that the potential ending point is the ending point of the transit journey comprises one or more of:
determining that one or more geo-locations detected by the mobile device subsequently to the set of the sensory data gathered by and received from the mobile device subsequently to the second set of the sensory data are outside of the one or more transit routes supported by the one or more transit agencies, or
determining that the mobile device is able to access a Wi-Fi network or a Bluetooth beacon accessible from an exit area of the transit station defining the potential ending point.

8. The method according to claim 1, further comprising:
calculating, by the transit data processing engine, a fare for the transit journey based at least on the starting point and the ending point of the transit journey, wherein if it is determined that the transit journey falls within boundaries of a season ticket associated with the mobile device, the calculated fare is zero and if it is determined that the transit journey falls partially within the boundaries of the season ticket, the fare for the transit journey is calculated based on a part of the transit journey lying outside of the boundaries of the season ticket; or transmitting, to at least one of the one or more transit system servers associated with the transit journey, data concerning the transit journey for calculation of the fare, the data comprising at least the starting point and the ending point.

9. The method according to claim 1, wherein if, based on the second set of the sensory data, a determination of the transit journey fails, the method further comprises:
detecting a second potential transit journey with one or more transit agencies based on the transit data and one of: the first set of the sensory data, the second set of the sensory data, the subsequent set of the sensory data, or another subsequent set of the sensory data.

10. The method according to claim 1, wherein the sensory data is received in accordance with a reporting protocol defined in association with the plurality of sensors, wherein the reporting protocol comprises a pre-defined schedule, is event-based, or is a combination thereof.

11. The method according to claim 1, further comprising:
maintaining one or more additional sensors of the mobile device in an inactive state prior to detecting the starting point; and
activating the one or more additional sensors of the mobile device to gather and report additional sensory data in response to detecting the starting point.

12. The method according to claim 1, wherein
the transit journey comprises a first section, which lies within a transit network supported by a first of one more transit agencies, and a second section, which lies within a transit network supported by a second of the one or more transit agencies, wherein the first and second transit agencies are different.

13. A backend server comprising:
at least one processor;
a transit data processing engine; and
a memory storing instructions, which when executed by the at least one processor cause the transit data processing engine to:
receive sensory data gathered by a plurality of sensors of a mobile device registered for automatic tracking of transit journeys, the sensory data comprising at least one of data from an accelerometer and data from a gyroscope, the mobile device executing a transit application providing the sensory data concerning the plurality of sensors to the transit data processing engine, the providing of the sensory data to the transit data processing engine being performed regularly during a transit time of the mobile device and sporadically during other times, the transit time being learned by the mobile device;
detect, based on transit data received from one or more transit system servers and a first set of the sensory data, a starting point of a transit journey within the transit system, wherein detecting the starting point comprises determining that audio data of the first set of the sensory data, the audio data being a representation of audio, has one or more pre-determined audio characteristics that identify the transit station;
determine, based on the transit data and a second set of the sensory data, a transit stop of the transit journey within the transit system wherein the second set of the sensory data is received from the mobile device by the transit data processing engine subsequently to the first set of the sensory data;
analyse sensory data gathered by and received from the mobile device subsequently to the second set of the sensory data to detect an ending point of the transit journey;
correlate the transit journey having the starting point and the ending point gathered by the mobile device to an existing transit route to automatically calculate a respective fare; and
collect a payment for the transit journey.

14. The backend server according to claim 13, wherein the transit data processing engine is configured to perform one or more of:
determining that the sensory data, subsequent to the second set of the sensory data, comprises one or more geo-locations of the mobile device that correspond to one or more geo-locations along one or more transit routes supported by one or more transit agencies, wherein each of the one or more transit routes includes the starting point,
determining that the sensory data, subsequent to the second set of the sensory data, comprises one or more geo-locations of the mobile device that correspond to geo-locations along a transit route supported by the one or more transit agencies and were gathered at times in agreement with one or more of a timetable of the transit route or real-time transit updates for the one or more transit agencies in association with the transit route,
determining that the mobile device is able to access a Wi-Fi network or Bluetooth beacon accessible from a departure area of a transit station of the one or more transit agencies,
determining that the mobile device is able to access a Wi-Fi network or Bluetooth beacon accessible from a transit vehicle of the one or more transit agencies,
determining that a speed of movement of the mobile device corresponds to an estimated speed of a transit vehicle on an estimated transit route with the one or more transit agencies, the estimated transit route including the starting point, or
receiving an indication of the transit journey based on user input at the mobile device.

15. The backend server according to claim 13, wherein the transit data processing engine is configured to analyse the sensory data to detect the ending point of the transit journey by:
correlating, based on the transit data, the sensory data being received to one or more transit routes of one or more transit agencies comprising the starting point to detect the ending point of the transit journey on one of the one or more transit routes;
detecting, based on the set of the sensory data gathered by and received from the mobile device subsequently to the second set of the sensory data, a potential ending point of the transit journey along the one or more transit routes in response to determining one or more of:
that the set of the sensory data gathered by and received from the mobile device subsequently to the second set of the sensory data comprises a geo-location of the mobile device that corresponds to a geo-location of a transit station of the one or more transit agencies along the one or more transit routes, that the set of the sensory data gathered by and received from the mobile device subsequently to the second set of the sensory data indicates that the mobile device was able to access a Wi-Fi network or a Bluetooth beacon accessible from an arrival area of a transit station of the one or more transit agencies along the one or more transit routes, or that the set of the sensory data gathered by and received from the mobile device subsequently to the second set of the sensory data indicates that the mobile device stopped moving along the one or more transit routes of the one or more transit agencies; and analysing the sensory data received subsequently to the second set of the sensory data to confirm whether a potential ending point is the ending point of the transit journey.

16. The backend server according to claim 13, wherein the ending point is a transit station of one or more transit agencies that corresponds to a geo-location of the mobile device included in the set of the sensory data gathered by and received from the mobile device subsequently to the second set of the sensory data; and wherein the transit data processing engine is configured to confirm that a potential ending point is the ending point of the transit journey by performing one or more of:
  determining that one or more geo-locations detected by the mobile device subsequently to the set of the sensory data gathered by and received from the mobile device subsequently to the second set of the sensory data are outside of one or more transit routes supported by the one or more transit agencies, or
  determining that the mobile device is able to access a Wi-Fi network or a Bluetooth beacon accessible from an exit area of the transit station defining the ending point.

17. The backend server according to claim 13, wherein the transit data processing engine is further configured to
  calculate the fare for the transit journey based at least on the starting point and the ending point of the transit journey, or
  transmit, to at least one of one or more transit agencies associated with the transit journey, data concerning the transit journey for calculation of the fare, the data comprising at least the starting point and the ending point.

18. A mobile device for automatic tracking of transit journeys, the mobile device comprising:
  a plurality of sensors configured to gather sensory data;
  at least one processor;
  a transit data processing engine; and
  a memory storing instructions, which when executed by the at least one processor cause the transit data processing engine to
    receive the sensory data gathered by the plurality of sensors of registered for automatic tracking of transit journeys, the sensory data comprising at least one of data from an accelerometer and data from a gyroscope, the mobile device executing a transit application providing the sensory data concerning the plurality of sensors to the transit data processing engine, the providing of the sensory data to the transit data processing engine being performed regularly during a transit time of the mobile device and sporadically during other times, the transit time being learned by the mobile device;
    detect, based on transit data received from one or more transit system servers and a first set of the sensory data, a starting point of a transit journey within the transit system, wherein detecting the starting point comprises determining that audio data of the first set of the sensory data, the audio data being a representation of audio, has one or more pre-determined audio characteristics that identify the transit station;
    determine, based on the transit data and a second set of the sensory data, a transit stop of the transit journey within the transit system, wherein the second set of the sensory data is received from the mobile device subsequently to the first set of the sensory data;
    analyse sensory data gathered by and received from the mobile device subsequently to the second set of the sensory data to detect an ending point of the transit journey, or
    detect a second transit journey with one or more transit agencies based on the transit data and one of: the first set of the sensory data, the second set of the sensory data, or the subsequent set of the sensory data otherwise;
    correlate the transit journey having the starting point and the ending point gathered by the mobile device to an existing transit route to automatically calculate a respective fare; and
    collect a payment for the transit journey.

* * * * *